United States Patent
Dobashi

(10) Patent No.: US 12,307,831 B2
(45) Date of Patent: May 20, 2025

(54) COMMUNICATION DEVICE, COMMUNICATION METHOD, AND COMPUTER PROGRAM

(71) Applicant: HONDA MOTOR CO., LTD., Tokyo (JP)

(72) Inventor: Manabu Dobashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 160 days.

(21) Appl. No.: 18/109,879

(22) Filed: Feb. 15, 2023

(65) Prior Publication Data
US 2023/0298397 A1  Sep. 21, 2023

(30) Foreign Application Priority Data
Mar. 16, 2022  (JP) .................. 2022-041227

(51) Int. Cl.
G07C 5/08  (2006.01)
G07C 5/00  (2006.01)
(52) U.S. Cl.
CPC ........... *G07C 5/008* (2013.01); *G07C 5/0816* (2013.01)
(58) Field of Classification Search
CPC ........ G07C 5/008; G07C 5/0816; H04L 67/12
See application file for complete search history.

(56) References Cited

U.S. PATENT DOCUMENTS

2023/0252829 A1*  8/2023  Gutlein .................. G07C 5/008
701/29.1

FOREIGN PATENT DOCUMENTS

JP  6084128  2/2017

* cited by examiner

*Primary Examiner* — Kenneth J Malkowski
(74) *Attorney, Agent, or Firm* — Amin, Turocy & Watson, LLP

(57) ABSTRACT

A communication device including: a drive device communication unit that communicates with a drive device to which an own device is connected; an external communication unit that communicates with another device via a network; a notification information storage that stores notification information that is information acquired from a drive device connected to the drive device communication unit, the information indicating operation or a state of the drive device; and a controller that acquires the notification information from the drive device connected to the drive device communication unit, records, into the notification information storage, the notification information having been acquired, and upon receiving error information from the drive device, transmits one piece or a plurality of pieces of notification information stored in the notification information storage to a predetermined other device via the external communication unit.

6 Claims, 5 Drawing Sheets

| COMMUNICATION DEVICE IDENTIFICATION INFORMATION | TYPE IDENTIFICATION INFORMATION |
|---|---|
| t001 | e001 |
| t002 | e002 |
| ⋮ | ⋮ |

| TYPE IDENTIFICATION INFORMATION | SETTING INFORMATION |
|---|---|
| e001, e002, e003 | conf1 |
| e011, e012, e013, e014 | conf2 |
| ⋮ | ⋮ |

FIG. 6

| DRIVE DEVICE IDENTIFICATION INFORMATION | FAILURE INFORMATION | AUXILIARY SETTING INFORMATION |
|---|---|---|
| exx001 | xx1 | yy1 |
| exx002 | xx2 | yy2 |
| ⋮ | ⋮ | ⋮ |

COMMUNICATION DEVICE, COMMUNICATION METHOD, AND COMPUTER PROGRAM

CROSS-REFERENCE TO RELATED APPLICATION

Priority is claimed on Japanese Patent Application No. 2022-041227, filed on Mar. 16, 2022, the content of which is incorporated herein by reference.

BACKGROUND OF THE INVENTION

Field of the Invention

The present invention relates to a communication device, a communication method, and a computer program.

Description of Related Art

In recent years, acquisition of information regarding the operation and the state of a drive device for an automobile and an agricultural work vehicle by an information processing device such as a server from the drive device, determination of the state of the drive device, and utilization of the collected information for research, development, and the like have been practiced (see, for example, Japanese Patent No. 6084128).

SUMMARY OF THE INVENTION

However, constant collection of detailed information from the drive device causes problems such as an excessively large communication amount and a tight capacity of the storage device. On the other hand, when an error occurs in the drive device, detailed information is sometimes required by the analysis.

An aspect according to the present invention has been made in view of the above problems, and an object of the present invention is to provide a communication device, a communication method, and a computer program capable of appropriately acquiring information necessary for error analysis while suppressing an increase in a communication amount generated when acquiring information regarding an operation or a state of a drive device for an automobile.

In order to solve the above problems and achieve the object, the present invention adopts the following aspect.

A communication device of an aspect according to the present invention includes:
  a drive device communication unit that communicates with a drive device to which an own device is connected;
  an external communication unit that communicates with another device via a network;
  a notification information storage that stores notification information that is information acquired from a drive device connected to the drive device communication unit, the information indicating operation or a state of the drive device; and
  a controller that acquires the notification information from the drive device connected to the drive device communication unit, records, into the notification information storage, the notification information having been acquired, and upon receiving error information from the drive device, transmits one piece or a plurality of pieces of notification information stored in the notification information storage to a predetermined other device via the external communication unit.

According to the aspect according to the present invention, it is possible to appropriately acquire information necessary for error analysis while suppressing an increase in a communication amount generated when acquiring information regarding an operation or a state of a drive device for an automobile.

BRIEF DESCRIPTION OF THE DRAWINGS

FIG. 6 is a view illustrating a specific example of a device information table stored in a device information storage;

DETAILED DESCRIPTION OF THE INVENTION

Figure 1:
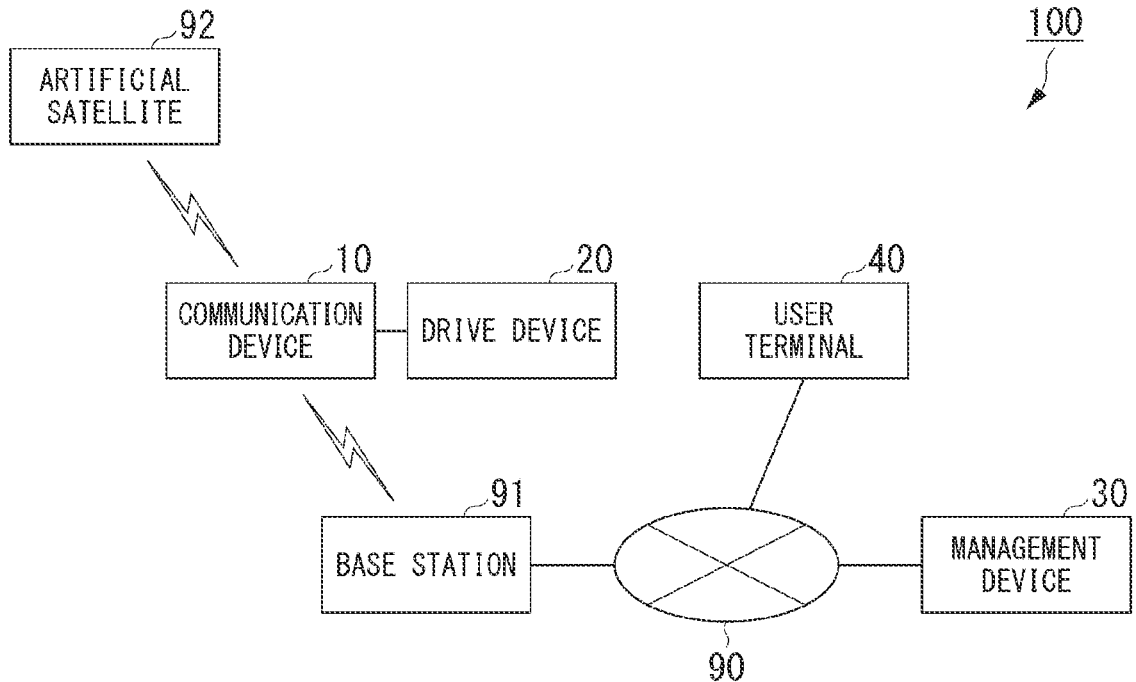
FIG. 1 is a schematic block diagram illustrating a system constitution of a drive device communication system according to an embodiment.

An embodiment will be described below in detail with reference to the accompanying drawings. The following embodiment does not limit the invention according to the claims, and all combinations of features described in the embodiment are not necessarily essential to the invention. Two or more features of a plurality of features described in the embodiment may be optionally combined. Identical or similar constitutions are denoted by identical reference numerals, and overlapping descriptions will be omitted.

FIG. 1 is a schematic block diagram illustrating the system constitution of a drive device communication system 100 according to an embodiment. First, an outline of the drive device communication system 100 will be described. The drive device communication system 100 includes a communication device 10, a drive device 20, and a management device 30. The communication device 10 is communicably connected to the drive device 20. The communication device 10 communicates with the management device 30 via a network 90. The communication device 10 may be connected to the network 90 via a base station 91, for example. The network 90 may be a network using wireless communication or a network using wired communication. The network 90 may be constituted by combining a plurality of networks. The communication device 10 may communicate with an artificial satellite 92. Each device will be described below in more detail. The drive device communication system 100 may be further provided with a user terminal 40. The user terminal 40 communicates with the management device 30 via the network 90, for example. Each device will be described below.

Figure 2:
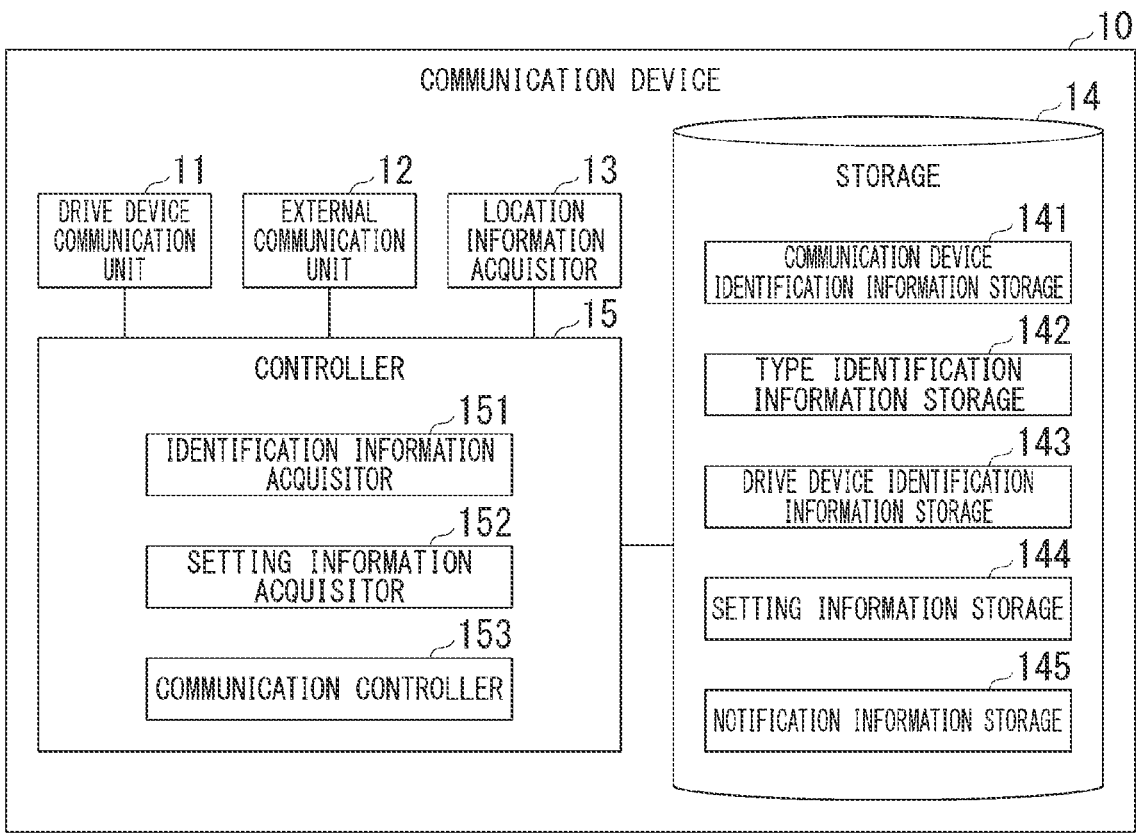
FIG. 2 is a view illustrating a specific example of a functional constitution of a communication device.

First, the communication device 10 will be described. FIG. 2 is a view illustrating a specific example of the functional constitution of the communication device 10. The communication device 10 is communicable information equipment. The communication device 10 may be, for example, a telematics control unit (TCU) or may be constituted as another communication device. The communication device 10 includes a drive device communication unit 11, an external communication unit 12, a location information acquisitor 13, a storage 14, and a controller 15.

The drive device communication unit 11 communicates with the drive device 20 to which the own device (communication device 10) is connected. More specifically, the drive device communication unit 11 may communicate with a control device (for example, an electronic control unit (ECU)) of the drive device 20. The drive device communication unit 11 may perform controller area network (CAN) communication with the drive device 20, for example.

The drive device communication unit 11 may be physically connected to the drive device 20 using a terminal, a plug, or the like. In this case, the drive device communication unit 11 may be constituted as a connector such as a terminal or a plug. The drive device communication unit 11 may be communicably connected to the drive device 20 by wire using a cable. In this case, the drive device communication unit 11 may be constituted as a communication interface including a connector to which a communication cable is connected. The drive device communication unit 11 may be communicably connected to the drive device 20 by wireless communication. In this case, the drive device communication unit 11 may be constituted as a communication interface that performs wireless communication with the drive device 20. The wireless communication performed between the drive device communication unit 11 and the drive device 20 may be, for example, short-range wireless communication (for example, Bluetooth (registered trademark)), a wireless local area network (LAN), Wi-Fi (registered trademark), or low power, wide area (LPWA).

The external communication unit 12 is a communication device communicably connected to the network 90, which is an example of an external network. The external communication unit 12 may be connected to the network 90, for example, by wirelessly communicating with the base station 91. The external communication unit 12 may be connected to the network 90 via the base station 91 using, for example, a 4G or 5G mobile communication technology. The external communication unit 12 communicates with another device via the network 90. For example, the external communication unit 12 communicates with the management device 30.

The location information acquisitor 13 acquires location information of the current location of the communication device 10. The location information acquisitor 13 acquires location information of the current location by communication with, for example, a satellite positioning system or a base station of a mobile phone network. Specific examples of the satellite positioning system include a global positioning system (GPS) and Galileo. The location information acquisitor 13 outputs the acquired location information to the controller 15. The drive device communication unit 11, the external communication unit 12, and the location information acquisitor 13 having been described above may be provided in a housing that integrally accommodates them. In this case, the communication device 10 further includes the housing.

The storage 14 includes a storage device such as a magnetic hard disk device or a semiconductor storage device. The storage 14 functions as a communication device identification information storage 141, a type identification information storage 142, a drive device identification information storage 143, a setting information storage 144, and a notification information storage 145. The communication device identification information storage 141 stores identification information (communication device identification information) assigned to the own device (communication device 10). The communication device identification information is different for each communication device 10. That is, the communication device identification information is information uniquely indicating the communication device 10.

The type identification information storage 142 stores type identification information of the drive device 20 to which the own device (communication device 10) is connected. The type identification information is information indicating the type of the drive device 20 such as a model name, a product name, and a model number of the drive device 20 (that is, information having the same value among the drive devices 20 of the same type). The type identification information may further include information indicating the version of the drive device 20.

The drive device identification information storage 143 stores identification information (drive device identification information) of the drive device 20 to which the own device (communication device 10) is connected. The drive device identification information may be identification information of the drive device 20 itself, for example, or identification information of an ECU provided in the drive device 20. The drive device identification information is identification information uniquely given to each drive device 20 or ECU.

The setting information storage 144 stores setting information. The setting information is information used when the controller 15 of the communication device 10 operates, and includes information indicating the content of the operation of the controller 15. The setting information may be, for example, the following information.

Content and type of information (notification information) acquired from the drive device 20 by the communication device 10

Timing at which the communication device 10 acquires each piece of notification information from the drive device 20

Timing at which the communication device 10 starts to acquire each piece of notification information from the drive device 20

Timing at which the communication device 10 transmits notification information acquired from the drive device 20 to another device (for example, the management device 30)

Content of information to be transmitted to another device (for example, the management device 30) among the notification information acquired by the communication device 10 from the drive device 20

Content of determination processing performed by the communication device on the basis of information acquired from the drive device 20

Timing at which the communication device 10 transmits information corresponding to a result of determination processing to another device (for example, the management device 30)

Timing at which the communication device 10 starts to transmit information corresponding to a result of determination processing to another device (for example, the management device 30)

Content of control of each piece of equipment included in the communication device 10 (for example, timing of activation)

For example, activation timing of the external communication unit 12 may be set by the setting information. At this time, this activation timing may be set to be different for each product. Such constitution can suppress cut.

The notification information storage 145 stores content of the notification information transmitted from the drive device 20. For example, the notification information storage 145 may store, in association with each other, the content of the notification information and information indicating the timing (for example, date and time) at which the notification information is acquired. The notification information storage 145 may discard notification information satisfying a predetermined condition indicating that the notification information has become old among the stored notification information, and not store the notification information thereafter having become old.

The controller 15 includes a processor such as a central processing unit (CPU) and a memory. The processor executes a program, whereby the controller 15 functions as an identification information acquisitor 151, a setting information acquisitor 152, and a communication controller 153. All or some of the functions of the controller 15 may be implemented by using hardware such as an application specific integrated circuit (ASIC), a programmable logic device (PLD), or a field programmable gate array (FPGA). The program may be recorded in a computer-readable recording medium. The computer-readable recording medium is, for example, a portable medium such as a flexible disk, a magneto-optical disk, a ROM, a CD-ROM, or a semiconductor storage device (for example, a solid state drive (SSD)), or a storage device such as a hard disk or a semiconductor storage device built in a computer system. The program may be transmitted via a telecommunication line.

The identification information acquisitor 151 communicates with the drive device 20 via the drive device communication unit 11, and acquires the type identification information of the drive device 20 to which the own device (communication device 10) is connected. The identification information acquisitor 151 records the acquired type identification information into the type identification information storage 142. The identification information acquisitor 151 may acquire drive device identification information of the drive device 20 to which the own device is connected. The identification information acquisitor 151 records the acquired drive device identification information into the drive device identification information storage 143.

The setting information acquisitor 152 communicates with the management device 30 via the external communication unit 12 to acquire setting information. At this time, the setting information acquisitor 152 acquires the setting information corresponding to the type identification information stored in the type identification information storage 142. That is, the setting information acquisitor 152 acquires the setting information corresponding to the type of the drive device 20 to which the own device (communication device 10) is connected. At this time, the setting information acquisitor 152 may further acquire setting information (auxiliary setting information described below) corresponding to the drive device identification information of the drive device 20 to which the own device is connected. The setting information acquisitor 152 records the acquired setting information into the setting information storage 144.

The communication controller 153 operates on the basis of the setting information stored in the setting information storage 144. The communication controller 153 controls, for example, communication with the drive device 20 via the drive device communication unit 11, communication with the management device 30 via the external communication unit 12, and operation of the own device. The communication controller 153 operates in accordance with the setting information stored in the setting information storage 144.

Next, the drive device 20 will be described. The drive device 20 is a device including a drive machine such as an engine or a motor. The drive device 20 may be a device that moves by drive of the drive machine, or may be a device that includes the drive machine but does not move by itself. The drive device 20 may be, for example, an automobile that moves with people and objects on board, may be a work machine such as a lawn mower or a snow blower, may be a marine engine (outboard motor) attached to a ship and driven, a transport vehicle, a generator, a general-purpose engine, or another device. The work machine may include, for example, a drive machine for a work unit separately from the drive machine that generates the movement power, or may be equipped with a transmission that distributes the power of the drive machine that generates the movement power to the work unit. The drive device 20 may be provided with a control device such as an ECU. In this case, the control device such as an ECU controls the operation of the drive device 20 or controls components provided in the drive device 20. The power source connected to the drive device 20 may supply power to the communication device 10 connected to the own device (drive device 20). The control device of the drive device 20 transmits, to the communication device 10, information (hereinafter, referred to as "notification information") indicating the operation and state of the own device (the drive device 20) (including the operation and state of components of the own device) at a predetermined timing, for example. The timing at which the control device transmits notification information to the communication device 10 may be determined in the drive device 20 in advance, may be set by the communication device 10, or may be a timing at which an inquiry is received from the communication device 10. The content of the notification information may be determined in advance in the drive device 20, may be set by the communication device 10, or may be defined in an inquiry transmitted from the communication device 10. The timing and content of such notification information may be defined in the setting information received by the communication device 10 from the management device 30.

Figures 3, 4, 5:
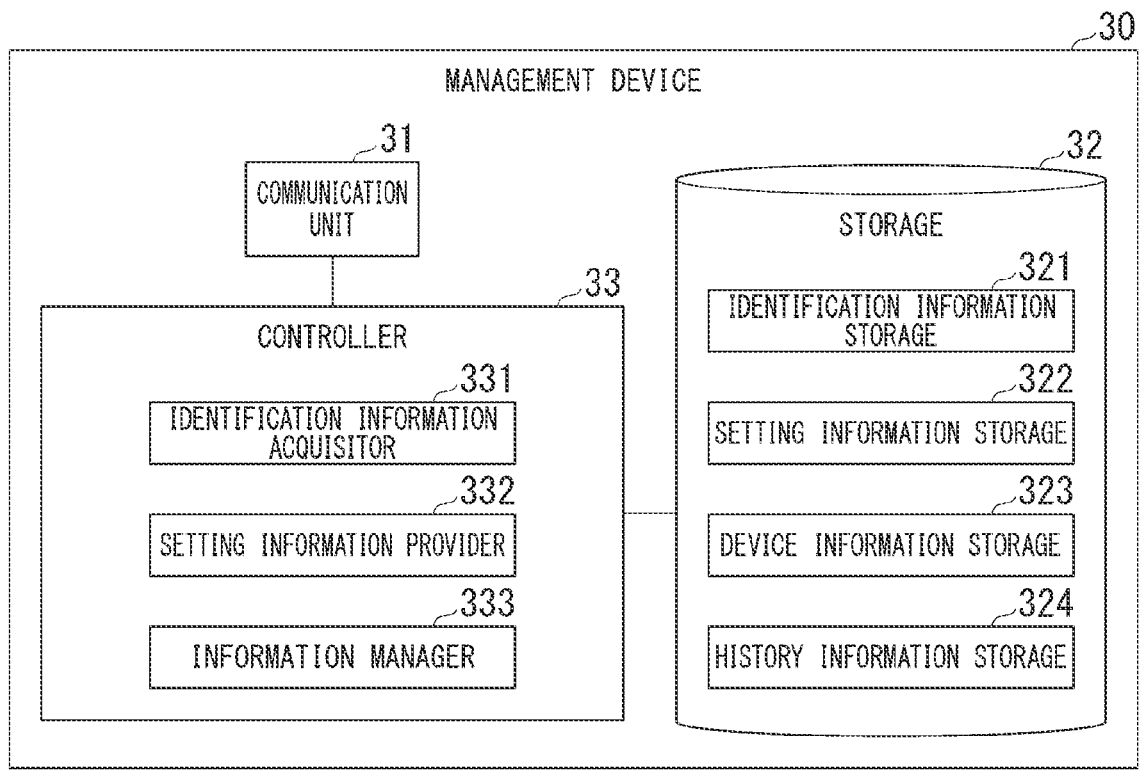
FIG. 3 is a view illustrating a specific example of a functional constitution of a management device.
FIG. 4 is a view illustrating a specific example of an identification information table stored in an identification information storage.
FIG. 5 is a view illustrating a specific example of a setting information table stored in a setting information storage.

Next, the management device 30 will be described. FIG. 3 is a view illustrating a specific example of the functional constitution of the management device 30. The management device 30 includes an information processing device such as a personal computer or a server device. The management device 30 includes a communication unit 31, a storage 32, and a controller 33.

The communication unit 31 is a communication device communicably connected to the network 90. The communication unit 31 communicates with another device via the network 90. For example, the communication unit 31 communicates with the communication device 10 and the user terminal 40.

The storage 32 includes a storage device such as a magnetic hard disk device or a semiconductor storage device. The storage 32 functions as an identification information storage 321, a setting information storage 322, a device information storage 323, and a history information storage 324.

FIG. 4 is a view illustrating a specific example of an identification information table stored in the identification information storage 321. The identification information table has a plurality of identification information records. The identification information record has values of communication device identification information and type identification information. The communication device identification information indicates the identification information of the communication device 10. The type identification information indicates the type of the drive device 20 to which the communication device 10 indicated by the communication device identification information of the same identification information record is connected. That is, the communication device 10 indicated by the communication device identification information included in the identification information record is connected to the drive device 20 of the type indicated by the type identification information included in the same identification information record. The identification information record may further have a value of the drive device identification information. In this case, the communication device identification information, the type identification information, and the drive device identification information are stored in association with one another.

FIG. 5 is a view illustrating a specific example of a setting information table stored in the setting information storage 322. The setting information table has a plurality of setting information records. The setting information record has values of type identification information and setting information. The type identification information indicates the type of the drive device 20. The setting information is setting information to be applied to the communication device 10 connected to the drive device 20 of the type indicated by the type identification information of the same setting information record. One setting information record may include one piece or a plurality of pieces of type identification information.

The device information storage 323 stores a device information table. The device information table includes a plurality of device information records. The device information record includes information indicating a history of the state of the drive device 20, and information indicating setting for the drive device 20, operation of the drive device 20, and the like. FIG. 6 is a view illustrating a specific example of a device information table stored in the device information storage 323. In the example of FIG. 6, the device information record has values of drive device identification information, failure information, and auxiliary setting information. The drive device identification information is identification information of the drive device 20. The failure information is information indicating a failure occurred in the past or a failure currently occurring in the drive device 20 indicated by the drive device identification information of the same device information record. The failure information may indicate the type of failure and the occurrence date and time of the failure. The auxiliary setting information indicates setting information additionally set in addition to the normally applied setting information for the drive device 20 indicated by the drive device identification information of the same setting information record. The auxiliary setting information may be automatically set by the controller 33 in accordance with, for example, failure information of the drive device 20, or may be set on the basis of information received from a terminal device (user terminal 40) of an owner of the drive device 20.

The history information storage 324 records a history of information transmitted from the communication device 10. For example, the communication device 10 transmits the notification information acquired from the drive device 20 to the management device 30 at a predetermined timing on the basis of the setting information stored in the own device. The history information storage 324 stores the notification information transmitted from each communication device 10. For example, the history information storage 324 may store the communication device identification information of the communication device 10, the drive device identification information of the drive device 20, the notification information acquired from the drive device 20, and the information indicating the date and time in association with one another. For example, the communication device 10 generates error report information on the basis of error information received from the drive device 20 and transmits the error report information to the management device 30. The history information storage 324 stores the error report information transmitted from each communication device 10.

The controller 33 includes a processor such as a CPU and a memory. The processor executes a program, whereby the controller 33 functions as an identification information acquisitor 331, a setting information provider 332, and an information manager 333. All or some of the functions of the controller 33 may be implemented by using hardware such as an ASIC, a PLD, or an FPGA. The program may be recorded in a computer-readable recording medium. The computer-readable recording medium is, for example, a portable medium such as a flexible disk, a magneto-optical disk, a ROM, a CD-ROM, or a semiconductor storage device (for example, a solid state drive (SSD)), or a storage device such as a hard disk or a semiconductor storage device built in a computer system. The program may be transmitted via a telecommunication line.

The identification information acquisitor 331 communicates with the communication device 10 via the communication unit 31, and acquires identification information (communication device identification information) of the communication device 10 and type identification information of the drive device 20 to which the communication device 10 is connected. The identification information acquisitor 331 records, into the identification information storage 321, the acquired communication device identification information and type identification information in association with each other.

Upon receiving a request for the setting information from the communication device 10, the setting information provider 332 reads, from the setting information storage 322, the setting information corresponding to the type of the drive device 20 to which the communication device 10 is connected. For example, in a case where the type identification information is received at the time of requesting the setting information, the setting information provider 332 reads the setting information recorded in the setting information storage 322 in association with the type identification information. Then, the setting information provider 332 transmits the read setting information to the communication device 10 of the request source.

The request for the setting information may include the drive device identification information of the drive device 20 to which the communication device 10 of the transmission source is connected. In this case, the setting information provider 332 determines whether or not the drive device identification information of the request target is registered, in association with the auxiliary setting information, in the device information record stored in the device information storage 323. In a case where such auxiliary setting information is registered, the setting information provider 332 reads the auxiliary setting information and transmits the auxiliary setting information to the communication device 10 of the request source.

The information manager 333 manages information stored in the device information storage 323 and information stored in the history information storage 324. For example, the information manager 333 manages the auxiliary setting information stored in the device information storage 323. For example, the information manager 333 may register or change the auxiliary setting information for a specific drive device 20 on the basis of change information transmitted from the user terminal 40. Such change information includes the auxiliary setting information and the drive device identification information. On the basis of the received change information, the information manager 333 may newly register the device information record recorded in the device information storage 323, or may update the already registered device information. When the failure information is registered in the device information storage 323, the information manager 333 may register the auxiliary setting information in accordance with the failure information. A rule (association) as to what auxiliary setting information is registered in a case what failure information is registered may be determined in advance.

The information manager 333 receives the notification information and the error report information transmitted from each communication device 10 and records them into the history information storage 324. For example, the information manager 333 may record, into the history information storage 324 in association with one another, the communication device identification information of the communication device 10, the drive device identification information of the drive device 20, the notification information or the error report information acquired from the drive device 20, and the information indicating the date and time. The information manager 333 may determine whether or not a failure has occurred in each drive device 20 on the basis of the information stored in the history information storage 324. The failure determination criterion may be determined in advance. Upon determining that a failure has occurred, the information manager 333 registers the drive device identification information of the drive device 20 that is the determination target and the information indicating the determined failure into the device information storage 323 in association with each other.

Next, a first specific example of communication control based on the setting information will be described. For example, the communication device 10 may operate as follows on the basis of the setting information.

The communication controller 153 of the communication device 10 sets the content and the transmission timing of the notification information into the control device of the drive device 20 on the basis of the setting information. The control device of the drive device 20 generates and transmits, to the communication device 10, notification information with the content in accordance with the setting by the communication controller 153 of the communication device 10. The communication controller 153 records, into the notification information storage 145, the content of the notification information received (acquired) from the drive device 20. The communication controller 153 records the notification information such that the notification information is kept held in the notification information storage 145 for a predetermined period.

The control device of the drive device 20 determines whether or not a predetermined error has occurred in the own device, and transmits information (hereinafter, referred to as "error information") indicating the error to the communication device 10 in a case where it is determined that the predetermined error has occurred. The error information may include, for example, information indicating the type of error. For example, a diagnostic trouble code (DTC) may be used as the error information. Upon receiving the error information, the communication controller 153 of the communication device 10 generates and transmits, to the management device 30, error report information including at least notification information acquired in the past from the time point.

The error report information includes at least notification information acquired during a period from a time point at which the error information is received to a time point back in the past by a predetermined first time. The error report information may further include notification information acquired during a period from a time point at which the error information is received until a predetermined second time elapses. The lengths of the first time and the second time may be defined in the setting information. The first time may be set longer than the second time, the first time may be set shorter than the second time, or the first time and the second time may be set to the same length.

In order to generate such error report information, the notification information storage 145 continues to store the notification information for a time longer than the first time. Different values may be applied to the length of the first time and the length of the second time in accordance with the type identification information. These pieces of information may be defined in the setting information, for example.

Figure 7:
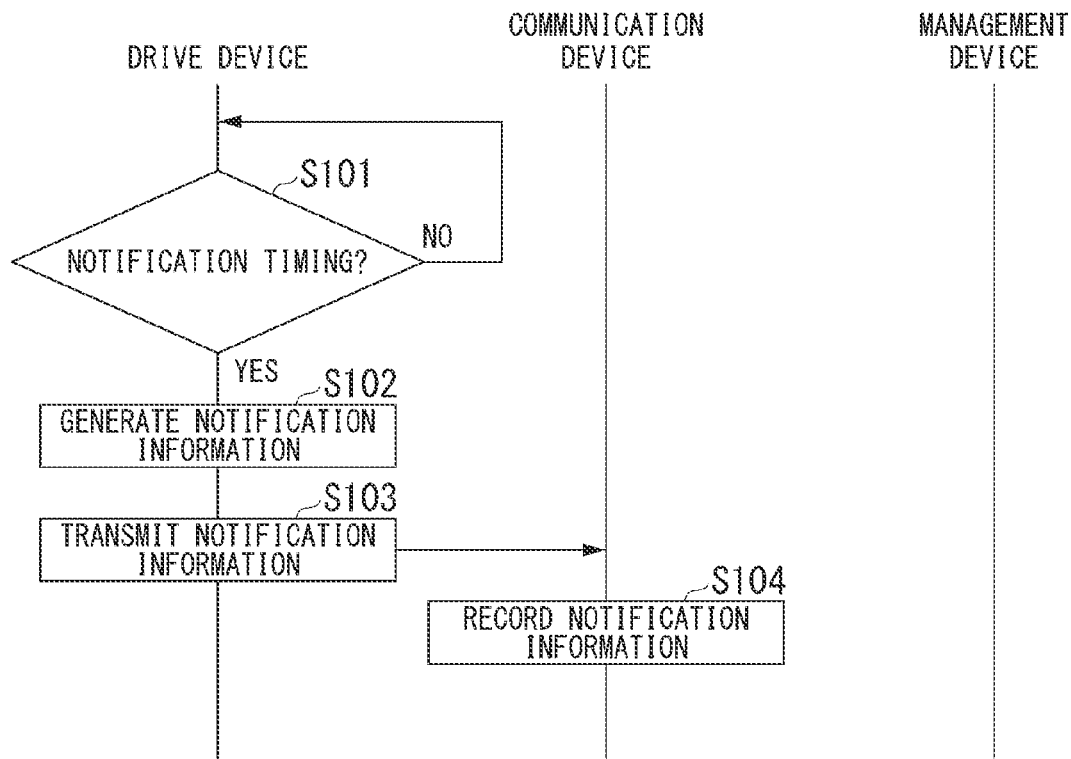
FIG. 7 is a sequence chart illustrating a specific example of an operation regarding notification information.
Figure 8:
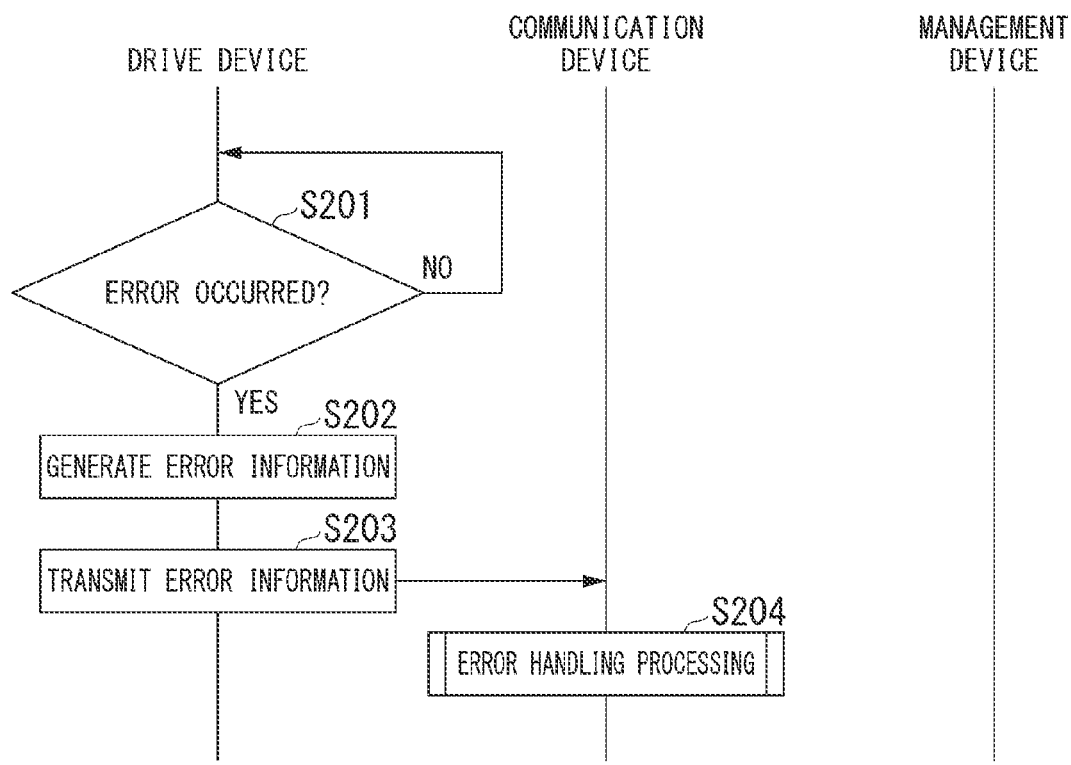
FIG. 8 is a sequence chart illustrating a specific example of an operation regarding error information, in particular.
Figure 9:
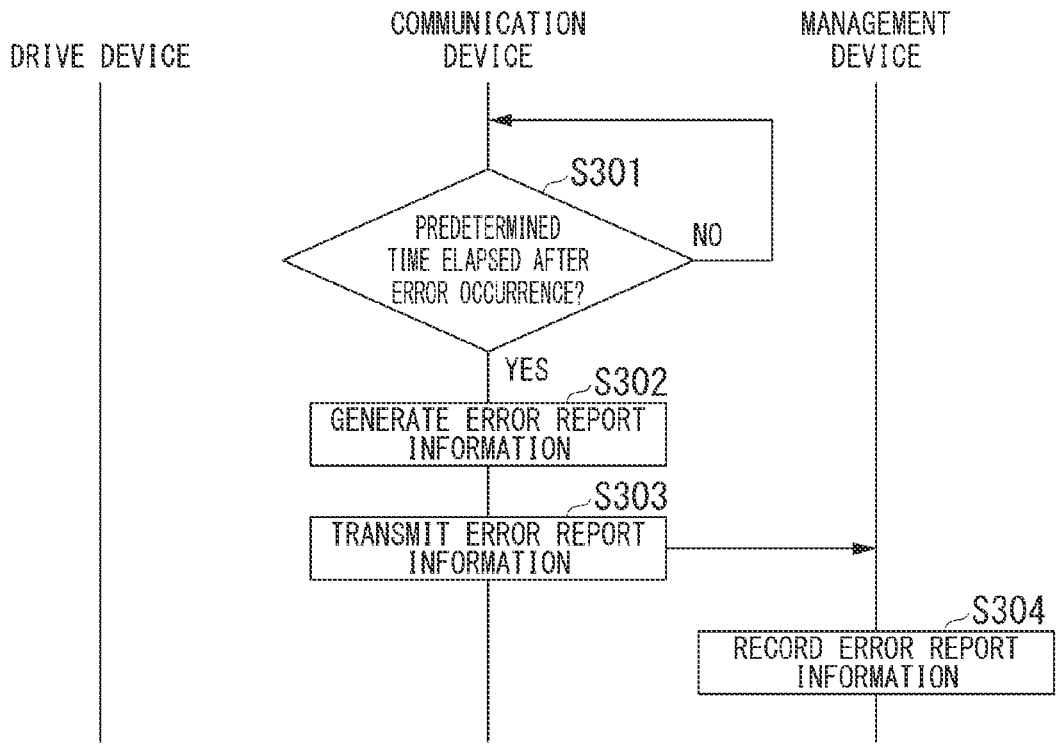
FIG. 9 is a sequence chart illustrating a specific example of an operation regarding error handling processing, in particular.

FIGS. 7 to 9 are sequence charts illustrating specific examples of the operation of the drive device communication system 100 including the communication device 10 that operates on the basis of the setting information as described above. FIG. 7 is a sequence chart illustrating a specific example of the operation regarding notification information, in particular. The control device of the drive device 20 waits for the processing regarding notification information until notification timing arrives (step S101—NO). When the notification timing arrives (step S101—YES), the control device generates notification information (step S102). Then, the control device transmits the generated notification information to the communication device 10 (step S103). Upon receiving the notification information, the communication controller 153 of the communication device 10 records the received notification information into the notification information storage 145 (step S104).

FIG. 8 is a sequence chart illustrating a specific example of the operation regarding error information, in particular. The control device of the drive device 20 waits for the processing regarding error information until an error occurs (step S201—NO).

When an error occurs (step S201—YES), the control device generates error information (step S202). Then, the control device transmits the generated error information to the communication device 10 (step S203). Upon receiving the error information, the communication controller 153 of the communication device 10 records the received error information into the notification information storage 145 and executes error handling processing (step S204).

FIG. 9 is a sequence chart illustrating a specific example of the operation regarding error handling processing, in particular. The communication controller 153 of the communication device 10 waits for generation of error report information until a predetermined time elapses after error occurrence (step S301—NO). This predetermined time is time equal to or longer than the second time. When the predetermined time elapses after the error occurrence (step S301—YES), the communication controller 153 generates error report information (step S302). Then, the communication controller 153 transmits the generated error report information to the management device 30 (step S303). The management device 30 records the received error report information into the history information storage 324 (step S304).

Figure 10:
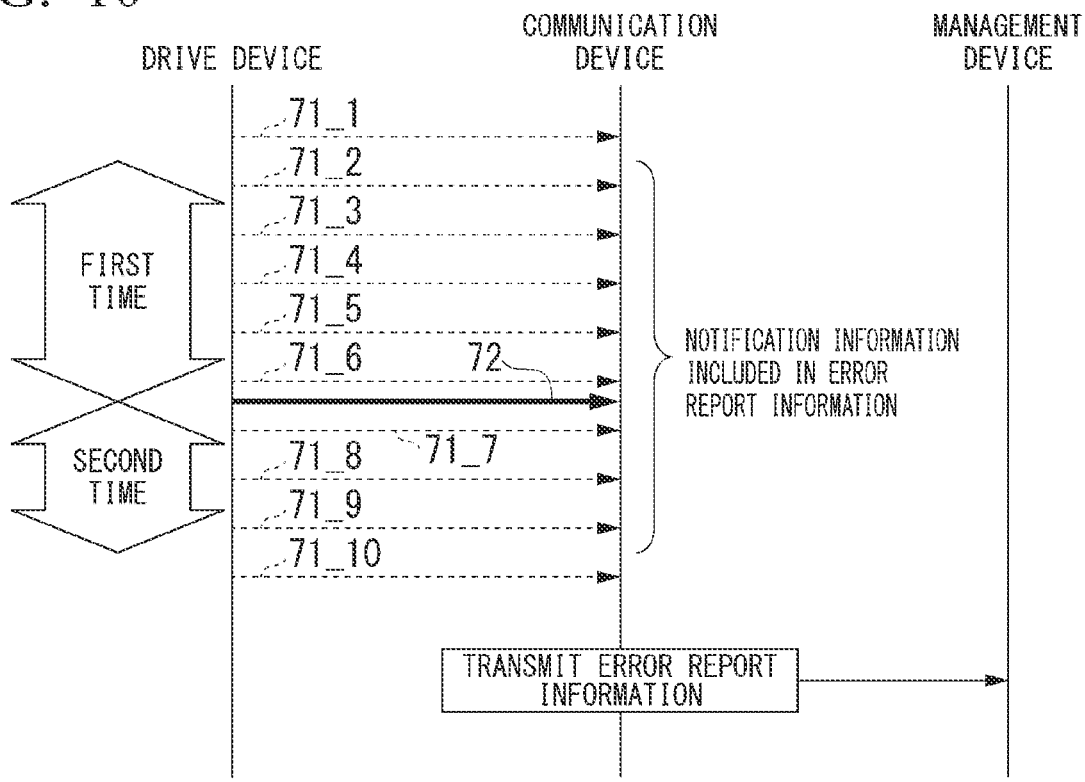
FIG. 10 is a schematic view illustrating a specific example of error report information.

FIG. 10 is a schematic view illustrating a specific example of error report information. In FIG. 10, a plurality of arrows 71 directed from the drive device 20 to the communication device 10 indicate notification information, and an arrow 72 directed from the drive device 20 to the communication device 10 indicates error information. In the example of FIG. 10, the notification information is transmitted from the drive device 20 to the communication device 10 at a predetermined cycle. When an error occurs, the drive device 20 transmits error information to the communication device 10 (arrow 72). Upon receiving the error information, the communication controller 153 of the communication device 10 generates and transmits, to the management device 30, error report information thereafter. The error report information includes one piece or a plurality of pieces of notification information (71_2 to 71_6) obtained during a period from a time point at which the error information is received to a time point back in the past by the first time and one piece or a plurality of pieces of notification information (71_7 to 71_9) obtained during a period from a time point at which the error information is received to a time point at which the second time elapses.

The drive device communication system 100 constituted as described above makes it possible to appropriately acquire information necessary for error analysis while suppressing an increase in the communication amount that occurs when acquiring information regarding the operation and the state of the drive device 20. Specifically, it is as follows.

In the drive device communication system 100, the drive device 20 transmits notification information to the communication device 10 at a predetermined timing. The notification information includes information regarding the operation and the state of the drive device 20. The communication device 10 stores the received notification information for a predetermined period. When the error information is transmitted from the drive device 20 to the communication device 10, the communication device 10 transmits, to the management device 30, one piece or a plurality of pieces of notification information obtained during the period from the time point at which the error information is received to the time point back in the past by the first time. Therefore, the management device 30 becomes possible to acquire the notification information obtained in the drive device 20 over a predetermined period (first time) immediately before the error occurs. Moreover, the notification information before the first time is not transmitted to the management device 30. Therefore, it is also possible to suppress an increase in the communication amount.

The communication device 10 may further transmit, to the management device 30, one piece or a plurality of pieces of notification information obtained during the period from the time point at which the error information is received to the time point at which the second time elapses. Such constitution enables the management device 30 to appropriately acquire information more necessary for error analysis.

The notification information included in the error report information is held not in the storage device of the drive device 20 but in the storage device of the communication device 10. Therefore, it becomes possible to transmit necessary notification information to the management device 30 without pressing the storage area of the drive device 20.

The notification information acquired by the communication device 10 from the drive device 20 may include, for example, one or more among the rotation speed per unit time of the engine, the presence or absence of rotation of a mowing blade, the rotation speed per unit time of the mowing blade, and the measurement value of a thermometer installed around the engine. In a case where the drive device 20 includes a motor, the rotation speed per unit time of the motor, a voltage value applied to the motor, a current value of the motor, and the like may be acquired from the drive device 20 by the communication device 10. In particular, when the drive device 20 is a work machine, information regarding a driver (an engine or a motor) mounted on the work machine may be used as the notification information. In particular, when the drive device 20 is a work machine, information regarding a driver (an engine or a motor) that drives the work unit (a blade of a lawn mower, an auger of a snow blower, a propeller of an outboard motor, and the like) mounted on the work machine may be used as the notification information.

In a case where the drive device 20 includes a battery, a variation value of the battery capacity or the like may be acquired from the drive device 20 by the communication device 10.

MODIFICATIONS

The device information storage 323 may store communication device identification information instead of the drive device identification information. In the device information storage 323, the drive device identification information and the communication device identification information may be registered in association with each other.

The management device 30 is not necessarily constituted as one device. For example, the management device 30 may include a plurality of information processing devices. The plurality of information processing devices constituting the management device 30 may be communicably connected via a communication path such as the network 90, and may be constituted as a system such as a cluster machine or a cloud.

Summary of Embodiment

The above embodiment discloses at least the following communication device and management device.

1. A communication device (for example, 10) of the above embodiment includes:
 a drive device communication unit (for example, 11) that communicates with a drive device (for example, 20) to which an own device is connected;
 an external communication unit (for example, 12) that communicates with another device (for example, 30) via a network (for example, 90);
 a notification information storage (for example, 145) that stores notification information that is information acquired from a drive device connected to the drive device communication unit, the information indicating operation or a state of the drive device; and a controller that acquires the notification information from the drive device connected to the drive device communication unit, records, into the notification information storage, the notification information having been acquired, and upon receiving error information from the drive device, transmits one piece or a plurality of pieces of notification information stored in the notification information storage to a predetermined other device via the external communication unit.

According to this embodiment, the notification information to be transmitted to the other device is held not in the storage device of the drive device but in the storage device of the communication device. Therefore, it becomes possible to transmit necessary notification information to another device without pressing the storage area of the drive device.

2. According to the above embodiment,
upon receiving error information from the drive device, the controller transmits, to a predetermined other device via the external communication unit, the notification information acquired during a period from at least a time point at which the error information is received to a time point back in a past by a predetermined first time.

According to this embodiment, the notification information notified before the error information is received can be transmitted to a predetermined other device. Therefore, it becomes possible to acquire detailed information before an error occurs.

3. According to the above embodiment,
the predetermined first time is defined in setting information corresponding to type identification information indicating a type of the drive device.

According to this embodiment, it is possible to individually set, as notification information, information necessary for analysis in accordance with the type of the drive device to which the communication device 10 is attached.

4. According to the above embodiment,
the drive device is a work machine, and
the notification information is information regarding a driver included in the work machine.

According to this embodiment,
it becomes possible to analyze a failure cause and determine necessity of repair on the basis of the information regarding the driver.

5. According to the above embodiment,
the error information is information generated when a control device of the drive device determines whether an error has occurred on the basis of information acquired by the drive device and determines that an error has occurred.

According to this embodiment,
it becomes possible to acquire log data for various errors.

6. According to the above embodiment,
a housing that integrally accommodates the drive device communication unit, the external communication unit, and the notification information storage is further included.

According to this embodiment,
integration enables one type of communication device to handle various models without modifying software.

7. In a communication method of the embodiment described above,
a computer including a drive device communication unit that communicates with a drive device to which an own device is connected, an external communication unit that communicates with another device via a network, and a notification information storage that stores notification information that is information acquired from a drive device connected to the drive device communication unit, the information indicating operation or a state of the drive device has a step of acquiring the notification information from the drive device connected to the drive device communication unit, a step of recording, into the notification information storage, the notification information having been acquired, and a control step of, upon receiving error information from the drive device, transmitting one piece or a plurality of pieces of notification information stored in the notification information storage to a predetermined other device via the external communication unit.

8. A computer program of the embodiment described above causes a computer including a drive device communication unit that communicates with a drive device to which an own device is connected, an external communication unit that communicates with another device via a network, and a notification information storage that stores notification information that is information acquired from a drive device connected to the drive device communication unit, the information indicating operation or a state of the drive device to function as a communication device including
a controller that acquires the notification information from the drive device connected to the drive device communication unit, records, into the notification information storage, the notification information having been acquired, and upon receiving error information from the drive device, transmits one piece or a plurality of pieces of the notification information stored in the notification information storage to a predetermined other device via the external communication unit.

While the modes for carrying out the present invention have been described above using the embodiment, the present invention is not limited to the embodiment described above, and various modifications and substitutions are possible within a range not departing from the gist of the present invention. Embodiments obtained by appropriately combining technical means disclosed in different embodiments are also included in the technical scope of the present invention.

What is claimed is:

1. A communication device which is connected to a drive device including a control device comprising a processor,
the control device performing:
a normal notification process of acquiring information indicating an operation or a state of the drive device from the drive device and providing notification information; and
an error determination process of determining that an error has occurred based on the information indicating the operation or the state of the drive device, and in response to determining that the error has occurred, generating and transmitting error information,
the communication device comprising:
a drive device communication device that communicates with the drive device;
an external communication device that communicates with at least an external management device via a network;

a notification information storage device that stores the notification information that is information acquired from the drive device connected to the drive device communication device; and a controller representative of one or more processors that acquires the notification information from the drive device connected to the drive device communication unit, records, into the notification information storage, the notification information having been acquired, wherein the controller receives the error information from the drive device, the controller transmits, to the external management device via the external communication device, the notification information acquired during a period from a first time point back in a past by a first time from a second time point at which the error information is received, to a third time point at which a second time elapses from the second time point at which the error information is received.

2. The communication device according to claim 1, wherein the predetermined first time is defined in setting information corresponding to type identification information indicating a type of the drive device.

3. The communication device according to claim 1, wherein the drive device is a work machine, and the notification information is information regarding a driver included in the work machine.

4. The communication device according to claim 1, further comprising a housing that integrally accommodates the drive device communication unit, the external communication unit, and the notification information storage.

5. A communication method, wherein a computer including a drive device communication device that communicates with a drive device, an external communication device that communicates with at least an external management device via a network, and a notification information storage device that stores notification information that is information acquired from the drive device connected to the drive device communication device, wherein the computer performs:

a normal notification step of acquiring information indicating an operation or a state of the drive device from the drive device and providing notification information; and a error determination step of determining that an error has occurred based on the information indicating the operation or the state of the drive device, and in response to determining that the error has occurred, generating and transmitting error information, a step of acquiring the notification information from the drive device connected to the drive device communication unit, a step of recording, into the notification information storage, the notification information having been acquired, and a control step of, in response to receiving the error information from the drive device, transmitting, to the external management device via the external communication device, the notification information acquired during a period from a first time point back in a past by a first time from a second time point at which the error information is received, to a third time point at which a second time elapses from the second time point at which the error information is received.

6. A computer program for causing a computer including a drive device communication that communicates with a drive device, an external communication device that communicates with at least an external management device via a network, and a notification information storage device that stores notification information that is information acquired from the drive device connected to the drive device communication device, wherein the computer functions as a communication device and performs:

acquiring information indicating an operation or a state of the drive device from the drive device and providing notification information; and determining that an error has occurred based on the information indicating the operation or the state of the drive device, and in response to determining that the error has occurred, generating and transmitting error information, acquiring the notification information from the drive device connected to the drive device communication unit, recording, into the notification information storage, the notification information having been acquired, and in response to receiving the error information from the drive device, transmitting, to the external management device via the external communication device, the notification information acquired during a period from a first time point back in a past by a first time from a second time point at which the error information is received, to a third time point at which a second time elapses from the second time point at which the error information is received.

* * * * *